April 25, 1950     H. W. LEVERENZ     2,505,621
ZINC CADMIUM SULFOSELENIDE PHOSPHORS Filed June 22, 1946     2 Sheets-Sheet 1

INVENTOR.
*Humboldt W. Leverenz*
BY
*C D Tuska*
ATTORNEY.

Patented Apr. 25, 1950

2,505,621

UNITED STATES PATENT OFFICE 2,505,621

ZINC CADMIUM SULFOSELENIDE PHOSPHORS

Humboldt W. Leverenz, Princeton, N. J., assignor to Radio Corporation of America, a corporation of Delaware Application June 22, 1946, Serial No. 678,539

16 Claims. (Cl. 252—301.6)

This invention relates to improvements in luminescent compositions, more specifically defined as crystalline inorganic materials, which, when subjected to undulatory or corpuscular radiations having quantum energies greater than about 1 electron volt, emit light in excess of thermal radiation.

More specifically, the invention relates to the preparation of efficient phosphors having improved stability and broader emission bands under general undulatory and corpuscular excitation. By corpuscular excitation is meant that type exemplified by cathode rays, alpha particles and the like and by undulatory is meant the type covered by ultraviolet rays, X-rays, gamma rays, etc. These phosphors have many applications such as in the luminescent screens of oscilloscope, television, and radar cathode ray tubes or for general illumination under near ultraviolet.

Luminescent or phosphor materials of a crystalline inorganic nature have been in general commercial use for some time. Although many different types of compositions have been proposed, the ones in most general cathode ray tube use have been those consisting of the basic ingredients ZnS : CdS in varying proportions. Another type which has been proposed is one in which selenium is substituted for part of the sulfur in a ZnS phosphor so that it may be said to comprise the system ZnS : ZnSe.

Both of these systems have certain disadvantages which limit their usefulness in many types of luminescent screens. For example, the ZnS : CdS system although quite efficient is hypersensitive to contamination and mechanical working. Phosphors chosen from this general system suffer undue losses of efficiency during processing of electron-discharge tubes, especially those containing cesium-silver oxide photocathodes: i. e., image tubes. On the other hand, phosphors made according to the present invention suffer relatively little loss in efficiency when processed.

Furthermore, both the ZnS : CdS and ZnS : ZnSe systems have emission bands which, although they may be said to be normal compared to those of other prior art phosphors, are quite limited in width. For example, their emission band width at half the peak emission value is not more than about 1200 A. whereas the visible spectrum is about 3500 A. wide. Because of this limited width, it is necessary to combine at least two phosphors in order to get a satisfactory white emitting composition for television projection screens. This is usually done by mechanically mixing a composition which has peak emission in the yellow and one which has a complementary peak emission in the blue.

Phosphors made according to the present invention have emission band widths relatively much greater in extent, for example, up to 2500 A. and more. They afford a means of obtaining white-appearing luminescences using a single composition and therefore have definite advantages for television and general illumination.

One object of the invention is to provide luminescent compositions having relatively high stability and emission.

Another object is to provide luminescent compositions having relatively wide emission bands within the visible spectrum.

Another object is to provide improved phosphor compositions affording white-appearing luminescence.

Another object is to provide a series of improved phosphor compositions having peak emission in almost any desired part of the visible spectrum.

Another object is to provide improved luminescent compositions especially adapted for use on television cathode ray tube screens.

Another object is to provide phosphor compositions having substantially decreased absorption of visible light.

Still another object of the present invention is to provide improved phosphor compositions using activators to increase their efficiency and control their phosphorescence and color characteristics.

These and other objects will be more apparent and the invention will be better understood from the following description, including the drawings of which Fig. 1 is a composition tetrahedron for the system Zn—Cd—S—Se plotted on a linear mole percent basis together with a plane defining the possible compositions when the components are present in stoichiometric proportions.

Figure 1:
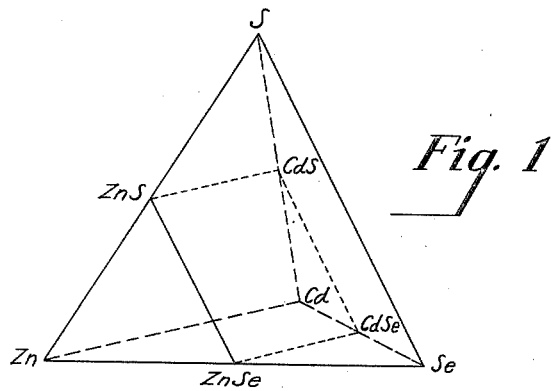

ZnS : ZnSe : CdS : CdSe : Ag : Cu defining the limits of the compositions which fall within the present invention. The $x$- and $y$-axes as well as each half of the $z$-axis is intended to be one unit in length. However, for purposes of illustrating a solid figure on a plane surface, the z-axis has been shortened in the drawing.

Figure 4:
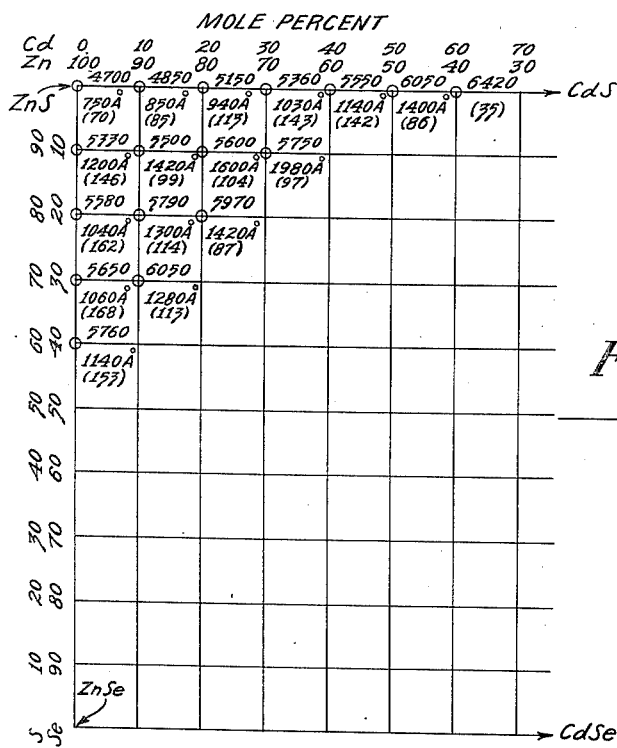

Fig. 4 is a diagram illustrating half-widths in Å. of the emission bands for various compositions within part of the phosphor system: Zn : Cd : S : Se with no activator present. Relative luminescences are given and peak emission wavelengths are also shown.

The present invention comprises the addition of Se in definite proportions to the phosphor system Zn+Cd+S to form a new system $$Zn+Cd+S+Se$$

as distinguished from merely using Se in place of S to form a system Zn+Cd+Se. The selenium may be added to the system either with or without an activator and results in the formation of phosphors having greatly improved stability with respect to contamination and also having increased color range.

Merely substituting Se for part or all of the S in a sulfide phosphor will not necessarily result in an improved phosphor such as one contemplated by the present invention nor will it necessarily produce a phosphor which will even emit within the visible part of the spectrum.

It is first necessary that the four ingredients Zn, Cd, S and Se be present in substantially stoichiometric proportions or as expressed by Equation 1 below with all quantities being present on a gram-molecular basis.

(1)   $Zn+Cd=S+Se$

This is further illustrated in Fig. 1 where the tetrahedron shows all possible compositions within the system Zn—Cd—S—Se. The compositions of the present invention are all encompassed within the plane whose edge intercepts are ZnS—CdS—CdSe—ZnSe but not all compositions which would fall within this plane are a part of the present invention since there are further limitations. It has further been found that the proportion expressed in Equation 1 must be adhered to very closely, the allowable deviation being not more than 0.03 mole percent for any one ingredient. Larger variations than this drastically reduce the efficiency of the phosphor composition.

The improved luminescent compositions of the present invention are further defined by the following equations:

(2a)   $Zn \geq 0.0001 (Cd+S+Se)$ (2b)   $Cd \geq 0.0001 (Zn+S+Se)$ (2c)   $S \geq 0.0001 (Zn+Cd+Se)$ (2d)   $Se \geq 0.0001 (Zn+Cd+S)$ These equations state that each of the four basic ions must be present in an amount equal to or greater than 0.01 mole percent of the sum of the other three ions. Thus, those compositions which would fall on or very close to the edges of the plane illustrated in Fig. 1 are not a part of the present invention. Appreciable amounts of each of the four basic ingredients must be present.

Figure 2:
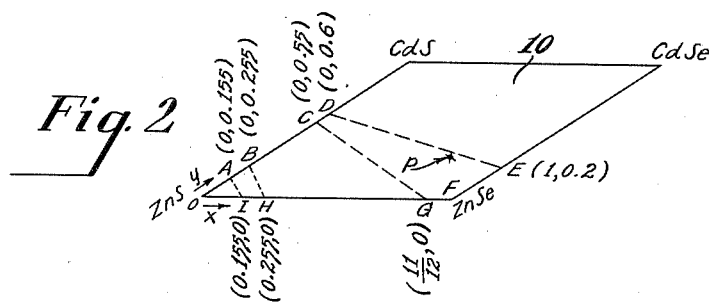
Fig. 2 is a plane representing all possible combinations of the system ZnS : CdS : CdSe : ZnSe with sectors defining compositions emitting in various parts of the visible spectrum.

The compositions of the present invention are still further limited to a certain portion of the area of the plane illustrated in Fig. 1. This is shown in Fig. 2. In this figure, the entire plane ZnS—CdS—CdSe—ZnSe is designated as 10. Within this plane the area A—D—E—F—I represents the various combinations of the basic ingredients which may be used to make up the compositions falling within the invention. If the plane 10 is considered as being erected on the pair of coordinate axes $x$ and $y$ with origin O at the ZnS intercept, then the area A—D—E—F—I will be that area cut off by the planes having the equations:

$$y=0; \; x=0; \; x=1; \; x+y=0.155$$

and $$2x+5y=3$$

where (3)   $x = \dfrac{\text{moles (Se)}}{\text{moles (Se)} + \text{moles (S)}}, \; 0 \leq x \leq 1$ and (4)   $y = \dfrac{\text{moles (Cd)}}{\text{moles (Cd)} + \text{moles (Zn)}}, \; 0 \leq y \leq 1$ Compositions falling outside the area A—D—E—F—I but still within the plane 10 emit mostly in the inefficient and/or invisible range of the spectrum and are therefore not useful for the present purposes.

In order to determine whether a specific composition is luminescent within the efficient visible range, a simple calculation is made as illustrated in the following example:

*Example 1*

A composition consisting of the ions, Zn, Cd, S, and Se is made up with the constituents present in the following proportions in moles percent:

Zn=80; Cd=20; S=80 and Se=20

Substituting in Equations 3 and 4

$$x = \frac{\text{moles (Se)}}{\text{moles (Se)} + \text{moles (S)}} = \frac{0.8}{0.8+0.2} = 0.8$$

$$y = \frac{\text{moles (Cd)}}{\text{moles (Cd)} + \text{moles (Zn)}} = \frac{0.2}{0.2+0.8} = 0.2$$

Plotting these values on their respective axes as in Fig. 2 shows that the plotted point, which is indicated as P in the figure, does fall within the area A—D—E—F—I. Therefore, it may be concluded that the proposed composition will luminesce within the efficient visible range of the spectrum.

In accordance with the invention, it is also possible to predict within which color range the peak emission of a certain luminescent composition will be. The area in Fig. 2 represented as A—B—H—I includes those compositions having peak emissions within the green range of from 5000 Å. to 5650 Å. This area may be defined as that portion of the plane 10 cut off by the planes having the equations:

$$x=0; \; y=0; \; x+y=0.155 \text{ and } x+y=0.255$$

Within this range is that wavelength, namely, 5560 Å. which is most efficient for the normal photopic eye; also the wavelength 5100 Å. which is most efficient for the dark-adapted (scotopic) eye.

The area B—C—G—H contains those compositions having peak emulsion values between 5650 Å. and 5850 Å. This is within the yellow range of the spectrum. Compositions emitting within this range are particularly useful as the yellow component of cathode-ray-tube screens for television since they form efficient color mixtures with the conventional blue-emitting ZnS:Ag phosphor. This particular area is defined as that portion of plane 10 cut off by planes having the equations:

$$x=0; \; y=0; \; x+y=0.255 \text{ and } 12x+20y=11$$

Orange-red emitting phosphors particularly useful for color television are included within the area C—D—E—F—G of Fig. 2. This area may be defined as that portion of plane 10 cut off by the planes having the equations:

$$x=0;\ y=0;\ 12x+20y=11\ \text{and}\ 2x+5y=3$$

In all of the above cases, $x$ and $y$ are defined as in Equations 3 and 4.

In order to obtain increased efficiency and stability in the phosphor compositions, made according to the invention, small amounts of activators such as silver or copper or both together may be added to the compositions which have been described. The total amount of activator added may be any amount up to about 0.02 percent by weight to the total phosphor base material and preferably is of the order of 0.005 percent. In general, the effect of adding silver as an activator is to shift the band of emission toward the shorter wavelengths while the effect of adding copper is to shift the emission to the longer wavelengths. Gold has also been tried as an activator in this system but has almost no effect compared to that of Cu or Ag. It shifts the band of emission very little and also results in very little increase in efficiency.

Where both silver and copper are added as activators, it is possible to obtain the novel effect of double peak emission. That is to say that a given phosphor composition with both silver and copper present as activators will emit visible light having maximum values at two widely separated points of the visible spectrum and both these points are approximately the respective ones at which peak emission would be obtained if either one of the activators were present alone. There is one usual advantage, however, in using the double activated system. The persistence of phosphorescence is markedly increased over using either one of the activators singly. The use of two activators in a phosphor composition is more completely described in another application of the same inventor, namely, Serial No. 412,687, filed September 27, 1941, now Patent No. 2,402,759.

Figure 3:
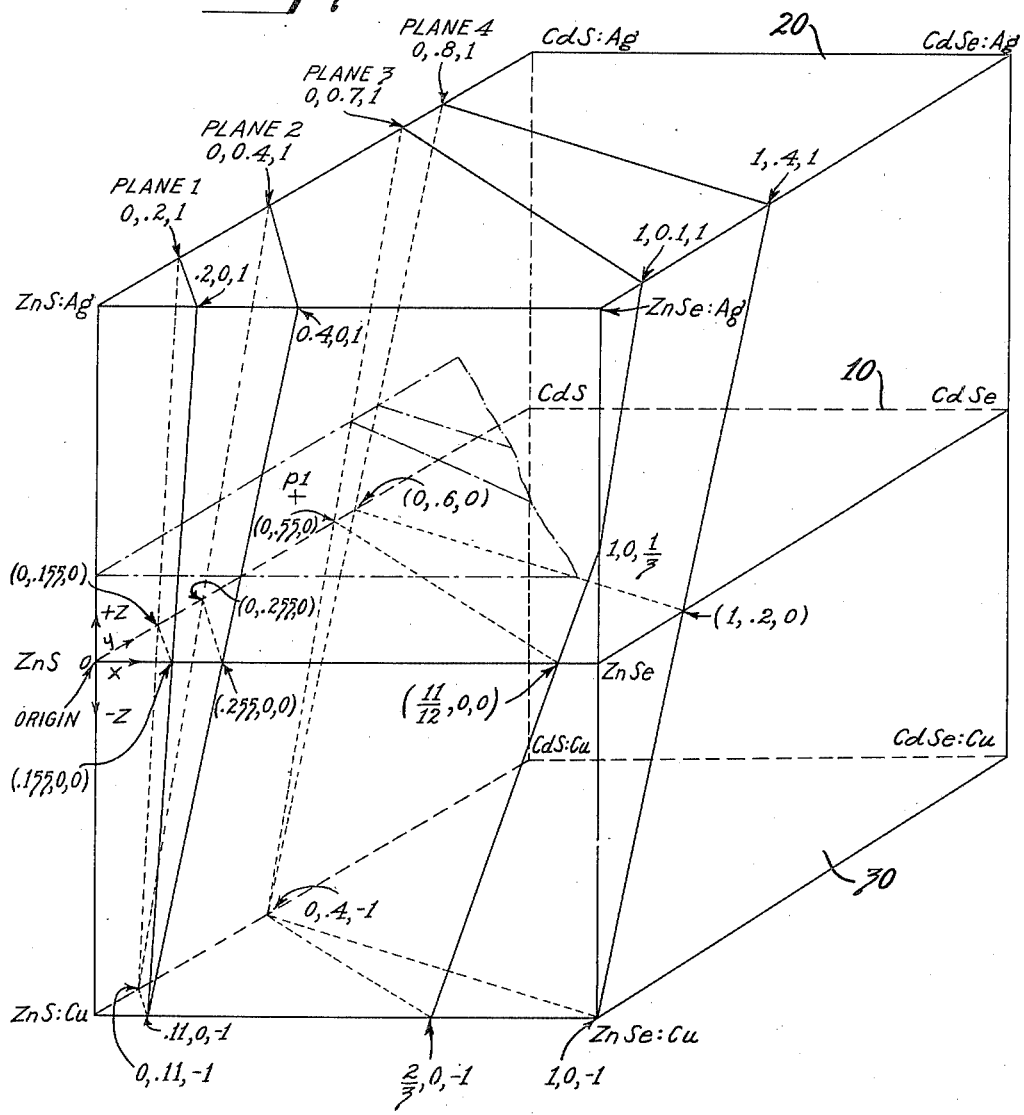
Fig. 3 is a composition volume figure for the general phosphor system

The general system of phosphor compositions with or without silver or copper as activators which can be made according to the present invention is illustrated in Fig. 3. In this figure, the system is represented by a polyhedron cut out of a double cube or cuboid. The plane 10 of Fig. 2, representing the compositions in which no activator is present, appears as the central horizontal plane of Fig. 3. The horizontal plane 20, or rather that portion which will later be more specifically defined, represents the limit of those compositions containing silver as an activator. A defined portion of the horizontal plane 30 represents a limit of those compositions containing copper as an activator.

The cuboid of Fig. 3 may be described as being constructed on the three axial Cartesian coordinates $x$, $y$, and $z$ with the intercept ZnS taken as the point of origin of the system. This cube is further defined as being bounded by planes having the equations:

$x=0$ (the $zy$ plane, left)
$y=0$ (the $zx$ plane, front)
$x=1$ (the $zy$ plane, right)
$y=1$ (the $zx$ plane, rear)
$z=1$ (top plane)

and $z=-1$ (bottom plane)

The entire useful family of compositions falling within the present invention may then be expressed as all those included within that part of the cuboid lying between planes 1 and 4. The space between these two planes is a polyhedron bounded in Cartesian coordinates by the following planes, expressed in the usual analytic form $Ax+By+Cz=1$:

$$x=0;\ y=0;\ x=1;\ z=1;\ z=-1$$
$$x+y-0.045z=0.155$$

and $$2x+5y-z=3$$

where $x$ and $y$ are defined according to Equations 3 and 4, respectively, and where (5) $z=\begin{cases} +\dfrac{\text{weight—percent (Ag)}}{.02},\ 0\leq z\leq 1 \\ -\dfrac{\text{weight—percent (Cu)}}{.02},\ 0\geq z\geq -1 \end{cases}$ The entire family of compositions with or without activators may be divided into several groups, each of which has peak emission in a different part of the visible spectrum. The preferred compositions having peak emission in the green range between 5000 Å. and 5650 Å. are contained within the part of the cuboid cut off by planes 1 and 2 as shown in Fig. 3. This space may be defined as a polyhedron bounded by the planes having the equations:

$$x=0;\ y=0;\ z=+1;\ x+y-0.045z=0.155$$

and $$x+y-0.145z=0.255$$

and where $x$, $y$, and $z$ are defined as in Equations 3, 4, and 5, respectively.

Those compositions having peak emission within the yellow range are included within that part of the cuboid cut off by planes 2 and 3 as shown in Fig. 3. This space may be defined as a polyhedron bounded by planes having the equations:

$$x=0;\ y=0;\ x=1;\ z=+1;\ z=-1$$
$$x+y-0.145z=0.255$$

and $$12x+20y-3z=11$$

and where $x$, $y$, and $z$ are defined as in Equations 3, 4 and 5 respectively.

The compositions having peak emission within the orange-red part of the spectrum are included within that part of the cuboid cut off by planes 3 and 4. This space may be defined as a polyhedron bounded by planes having the equations:

$$x=0;\ y=0;\ x=1;\ z=+1;\ z=-1$$
$$12x+20y-3z=11$$

and $$2x+5y-z=3$$

where $x$, $y$, and $z$ are defined as in Equations 3, 4, and 5, respectively.

When the phosphor compositions contain activators, they must also meet the other conditions stated previously for unactivated compositions. That is, the four basic ions Zn, Cd, S, and Se must be present in substantially stoichiometric proportions, and each basic ion must be present in an amount equal to or greater than 0.01 mole-percent of the sum of the other three. If a composition falls within the space defined as described above, it will automatically meet the limitation that the basic ions be present in substantially stoichiometric proportions.

It will be noted that the equations defining the phosphor compositions containing activators can be used to cover those cases in which no activator is present since under the latter conditions the "z" term merely becomes zero and the resulting equation is identical with the corresponding expression stated as being used when no activator is in the composition.

Under the invention as described above it becomes an easy matter to predict not only whether a certain composition containing Zn, Cd, S, and Se plus an activator will emit within the visible range of the spectrum but also the particular color band in which it will have peak emission. An example follows:

*Example 2*

A composition consisting of the ions Zn, Cd, S, and Se, with 0.005 percent by weight of silver as an activator, is made up with the constituents present in the following proportions in moles percent:

$$Zn=70, Cd=30, S=60, \text{ and } Se=40$$

Substituting in Equations 3, 4, and 5

$$x = \frac{\text{moles (Se)}}{\text{moles (Se)} + \text{moles (S)}} = \frac{0.4}{0.4+0.6} = 0.4$$

$$y = \frac{\text{moles (Cd)}}{\text{moles (Cd)} + \text{moles (Zn)}} = \frac{0.3}{0.3+0.7} = 0.3$$

$$z = \frac{\text{weight percent (Ag)}}{.02} = \frac{.005}{.02} = 0.25$$

Plotting these values on the $x$, $y$, and $z$ coordinates of Fig. 3, the intersection P' is seen to be well within the polyhedron representing the compositions of the present invention. Moreover, the intersection is seen to fall between planes 2 and 3 but closer to plane 3. Therefore, it can be predicted that peak emission of the phosphor will be in the yellow and almost in the orange range.

Compositions which fall within that part of the volume extending beyond plane 4 emit principally in the infrared. Hence, they would not be especially valuable for the present purposes which are related to those applications wherein a luminous surface is observed by the unaided human eye or with devices sensitive to radiations lying in the visible portion of the spectrum. Of those compositions which do fall between planes 1 and 4 maximum efficiency is obtained from the silver-activated phosphors whose base material compositions lie near the $yz$ plane as shown in Fig. 3. However, these compositions are not critical and all of the phosphors defined by Equations 1 and 2a to 2d which lie between planes 1 and 4 have usefully high visual efficiencies under either corpuscular or undulatory excitation.

Some specific examples of preparation of the improved phosphors are given in tabular form in the example below and immediately following are suitable directions for making them up:

*Example 3*

| | ZnSe | ZnS | CdS | NaCl | Ml. AgNO₃ (.0001 g. Ag/ml.) | Ml. CuCl₂ (.0001 g. Cu/ml.) |
|---|---|---|---|---|---|---|
| | Grams | Grams | Grams | Grams | | |
| (A) | 2.483 | 5.031 | 2.486 | 0.2 | 5 | |
| (B) | 1.146 | 5.411 | 3.443 | 0.2 | | |
| (C) | 2.643 | 6.696 | 0.661 | 0.2 | | 5 |

The anhydrous pure ZnSe, ZnS, CdS, and NaCl are comminuted and well mixed in a fused-silica crucible, moistened with pure distilled water and the activator solution added where indicated. The mixture is stirred, evaporated to dryness and heated in a globar-resistance furnace, starting at room temperature and attaining 780° C. in about 45 minutes. The temperature is held at this point for about 6 minutes after which the reaction product is removed from the furnace and cooled. The crucible is covered with a fused-silica lid during heating and cooling and preferably placed within another refractory crucible with a graphite lid to minimize oxidation. The sodium chloride serves as a flux. The resultant phosphors are washed to remove soluble chlorides and sodium sulphide and selenide produced by reaction between the flux and phosphor ingredients. Sodium chloride and other alkali halides as well as alkaline earth halides are preferred as fluxes and their concentration in the initial furnace batch may be varied from 0.01 to 20 percent by weight although optimum results are obtained in the range of about 0.5 to about 4 percent. The crystallization temperature and heating and cooling times are not very critical. The temperature of crystallization may be varied from about 500° C. to about 1400° C., and the crystallization time may be varied from about 5 minutes to about 20 hours depending on the particle size desired in the final phosphor. Higher temperatures and longer heating times afford larger particle size.

Although it is not necessary, efficiency of the reaction product is improved if there is provided before and during crystallization and cooling a neutral or non-oxidizing atmosphere such as nitrogen, neon, hydrogen sulfide, hydrogen selenide, or carbon disulfide and nitrogen. Effective control of the atmosphere during heating and cooling may best be accomplished in a pressure furnace operating between atmospheric pressure and about 2000 atmospheres.

Fig. 4 illustrates graphically one of the principal advantages obtained by using phosphors made up according to the present invention. The top horizontal axis represents the system ZnS : CdS using varying proportions of zinc and cadmium. The left hand vertical axis represents the system ZnS : ZnSe with the proportions of S and Se varied. Several phosphor compositions have been selected in each one of these simple systems and data have been given about each one. In each instance, the top figure is the wavelength in Å., of peak emission, the middle figure is the half-width of the emission band of that particular composition, also in Å., and the bottom figure is the relative luminescence compared to a standard consisting of alpha-zinc silicate activated with manganese ($Zn_2SiO_4$:Mn). The luminescence of the standard has been taken as equal to 100 units.

All points away from the edges of the figure, and therefore out in the area between the axes, represent various compositions in which varying percentages of all four ions Zn, Cd, S, and Se appear. Comparing the figures given for those compositions containing all four ions with the ones containing only three at once shows the marked increase in width of the emission bands obtained by using the four-component system. The numerical values given for the relative luminescences of the improved compositions as compared with those compositions lacking one of the four ions are misleading if another fact, mentioned earlier, is forgotten. It must be remembered that the older compositions lose a high proportion of their luminescence during processing while the materials of the present invention are very stable. It therefore results that after processing is completed the compositions containing all four ions have much higher visible light emission than those containing three of the ions or less. One contributing factor to this result is the much lower absorption of the visible light which is a characteristic of the improved compositions. Where a substantially white-emitting material is desired, as in television cathode ray tubes, it is also much more advantageous to use a single material which emits white than to use a composition which is a mixture of two materials, one of which emits blue and the other of which emits yellow, since in the latter case each material absorbs much of the visible light given off by the other and the resulting efficiency is relatively low.

There has thus been described a new series of improved phosphor compositions containing four basic ions, zinc, cadmium, sulfur, and selenium, and which may or may not have activators added. It is pointed out especially that formulas have been given for compounding the ingredients so as to obtain peak emission within any desired color range of the spectrum. Moreover, the limits of the compositions have been pointed out with a high degree of accuracy such that it is now possible to predict whether a given composition containing these four ions will emit enough visible light to be useful in a given situation.

I claim as my invention:

1. A luminescent composition consisting essentially of the reaction product formed by heating together at temperatures of 500° C. to 1400° C. for from 5 minutes to 20 hours substances containing only the four basic ions, zinc, cadmium, sulfur and selenium, in which each of said ions is present in an amount equal to at least 0.01 mole percent of the sum of the other three of said ions, and in the presence of up to 0.02 percent by weight of at least one activator selected from the class consisting of copper and silver and in which the relative proportions of the constituent ions is such that their numerical values when expressed as Cartesian coordinates fall within the polyhedron bounded in Cartesian coordinates by the following planes expressed in the usual analytic form $Ax+By+Cz=1$:

$x=0;\ y=0;\ x=1;\ z=1;\ z=-1;\ x+y-0.045z=0.155$
and
$$2x+5y-z=3$$
and where
$$x = \frac{\text{moles (Se)}}{\text{moles (Se)} + \text{moles (S)}}$$
$$y = \frac{\text{moles (Cd)}}{\text{moles (Cd)} + \text{moles (Zn)}}$$
and
$$z \equiv \begin{cases} \dfrac{\text{weight percent (Ag)}}{0.02} \\ -\dfrac{\text{weight percent (Cu)}}{0.02} \end{cases}$$

2. The composition of claim 1 in which said activator is copper which is present in about 0.005 percent by weight of the total phosphor base material.

3. The composition of claim 1 in which said activator is silver which is present in about 0.005 percent by weight of the total phosphor base material.

4. A luminescent composition having peak emission within the green range of the spectrum consisting essentially of the reaction product formed by heating together at temperatures of 500° C. to 1400° C. for from 5 minutes to 20 hours substances containing only the four basic ions, zinc, cadmium, sulfur and selenium, in which each of said ions is present in an amount equal to at least 0.01 mole percent of the sum of the other three of said ions, and in the presence of up to 0.02 percent by weight of an activator selected from the class consisting of copper and silver and in which the relative proportions of the constituent ions is such that their numerical values when expressed as Cartesian coordinates fall within the polyhedron bounded in Cartesian coordinates by the following planes expressed in the usual analytic form $Ax+By+Cz=1$:

$x=0;\ y=0;\ x=1;\ z=1;\ z=-1;\ x+y-0.045z=0.155$
and
$$x+y-0.145z=0.255$$
and where
$$x \equiv \frac{\text{moles (Se)}}{\text{moles (Se)} + \text{moles (S)}}$$
$$y = \frac{\text{moles (Cd)}}{\text{moles (Cd)} + \text{moles (Zn)}}$$
and
$$z \equiv \begin{cases} \dfrac{\text{weight percent (Ag)}}{0.02} \\ -\dfrac{\text{weight percent (Cu)}}{0.02} \end{cases}$$

5. The composition of claim 4 in which said activator is copper which is present in about 0.005 percent by weight of the total phosphor base material.

6. The composition of claim 4 in which said activator is silver which is present in about 0.005 percent by weight of the total phosphor base material.

7. A luminescent composition having peak emission within the yellow range of the spectrum, said composition consisting essentially of the reaction product formed by heating together at temperatures of 500° C. to 1400° C. for from 5 minutes to 20 hours substances containing only the four basic ions, zinc, cadmium, sulfur and selenium, in which each of said ions is present in an amount equal to at least 0.01 mole percent of the sum of the other three of said ions, and in the presence of up to about 0.02 percent by weight of at least one activator selected from the class consisting of copper and silver and in which the relative proportions of the constituent ions is such that their numerical values when expressed as Cartesian coordinates fall within the polyhedron bounded in Cartesian coordinates by the following planes expressed in the usual analytic form $Ax+By+Cz=1$:

$x=0;\ y=0;\ z=1;\ z=-1;\ x=1;\ x+y-0.145z=0.255$
and
$$12y+20y-3z=11$$
and where
$$x = \frac{\text{moles (Se)}}{\text{moles (Se)} + \text{moles (S)}}$$
$$y = \frac{\text{moles (Cd)}}{\text{moles (Cd)} + \text{moles (Zn)}}$$
and
$$z \equiv \begin{cases} \dfrac{\text{weight percent (Ag)}}{0.02} \\ -\dfrac{\text{weight percent (Cu)}}{0.02} \end{cases}$$

8. The composition of claim 7 in which said activator is copper, which is present in about 0.005 percent by weight of the total phosphor base material.

9. The composition of claim 7 in which said activator is silver which is present in about 0.005 percent by weight of the total phosphor base material.

10. A luminescent composition having peak emission within the orange-red range of the spectrum, said composition consisting essentially of the reaction product formed by heating together at temperatures of 500° C. to 1400° C. for from 5 minutes to 20 hours substances containing only the four basic ions, zinc, cadmium, sulfur and selenium, in which each of said ions is present in an amount equal to at least 0.01 mole percent of the sum of the other three of said ions, and in the presence of up to 0.05 mole percent by weight of at least one activator selected from the class consisting of copper and silver and in which the relative proportions of the constituent ions is such that their numerical values when expressed as Cartesian coordinates fall within the polyhedron bounded in Cartesian coordinates by the following planes expressed in the usual analytic form $Ax+By+Cz=1$:

$x=0$; $y=0$ $x=1$; $z=+1$; $z=-1$; $12x+20y-3z=11$ and $$2x+5y-z=3$$

and where $$x \equiv \frac{\text{moles (Se)}}{\text{moles (Se)} + \text{moles (S)}}$$

$$y = \frac{\text{moles (Cd)}}{\text{moles (Cd)} + \text{moles (Zn)}}$$

and $$z \equiv \begin{cases} \dfrac{\text{weight percent (Ag)}}{0.02} \\ -\dfrac{\text{weight percent (Cu)}}{0.02} \end{cases}$$

11. The composition of claim 10 in which said activator is copper which is present in about 0.005 percent by weight of the total phosphor base material.

12. The composition of claim 10 in which said activator is silver which is present in about 0.005 percent by weight of the total phosphor base material.

13. A luminescent composition consisting essentially of the reaction product formed by heating together at temperatures of 500° C. to 1400° C. for from 5 minutes to 20 hours substances containing the four basic ions zinc, sulfur, cadmium and selenium, each of said ions being present in an amount which is equal to at least 0.01 mole percent of the sum of the other three of said ions, and in which the relative proportion of the said four ions is such that their numerical values, when expressed as Cartesian coordinates, fall within the plane bounded in Cartesian coordinates by the following planes:

$y=0$; $x=0$; $x=1$; $x+y=0.155$ and $$2x+5y=3$$

where $$x \equiv \frac{\text{moles (Se)}}{\text{moles (Se)} + \text{moles (S)}}$$

and $$y = \frac{\text{mole (Cd)}}{\text{moles (Cd)} + \text{moles (Zn)}}$$

14. A composition according to claim 13 in which said planes are: $x=0$; $y=0$; $x+y=0.155$ and $x+y=0.255$.

15. A composition according to claim 13 in which said planes are: $x=0$; $y=0$; $x+y=0.255$ and $12x+20y=11$.

16. A composition according to claim 13 in which said planes are: $x=0$; $y=0$; $12x+20y=11$ and $2x+5y=3$.

HUMBOLDT W. LEVERENZ.

REFERENCES CITED

The following references are of record in the file of this patent:

UNITED STATES PATENTS

| Number | Name | Date |
| --- | --- | --- |
| 2,126,233 | Wakenhut | Aug. 9, 1938 |

FOREIGN PATENTS

| Number | Country | Date |
| --- | --- | --- |
| 378,940 | Italy | Feb. 27, 1940 |
| 663,828 | Germany | Aug. 13, 1938 |
| 209,909 | Switzerland | May 16, 1940 |